April 7, 1931.                  W. BEUSCH ET AL                      1,799,276
                                PREPAYMENT METER
                              Filed April 22, 1929
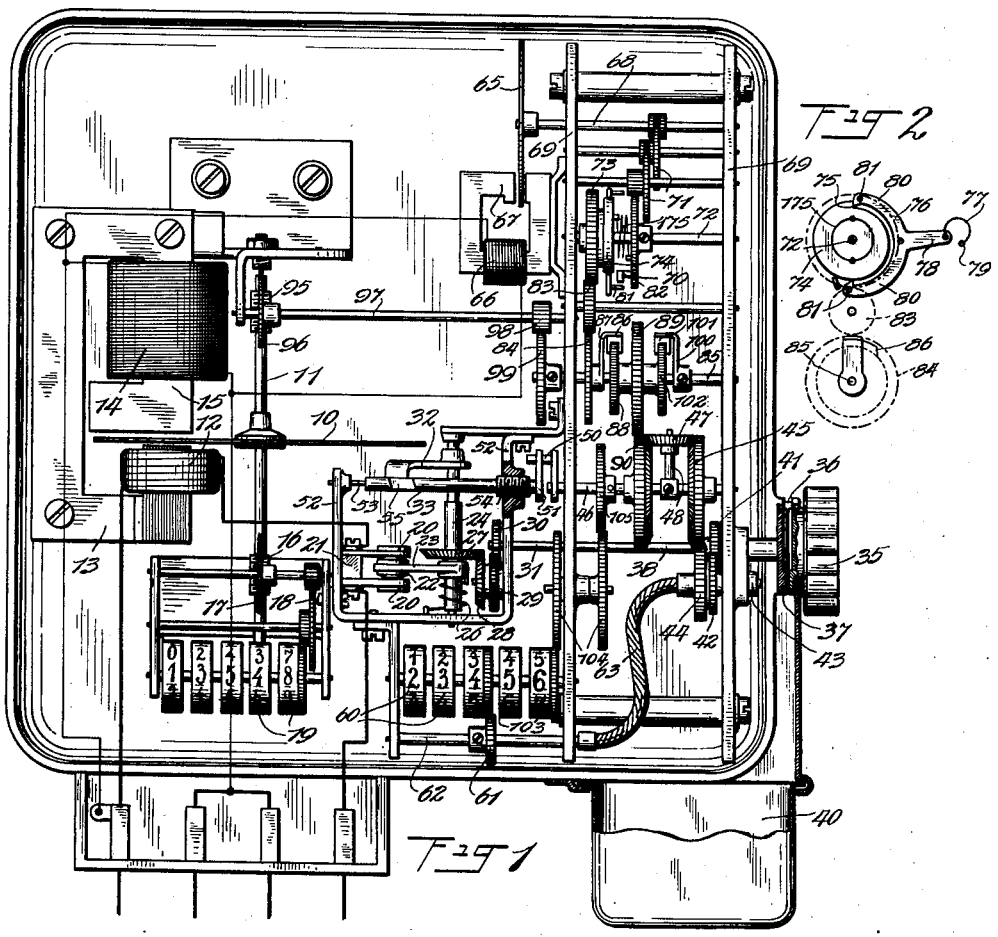
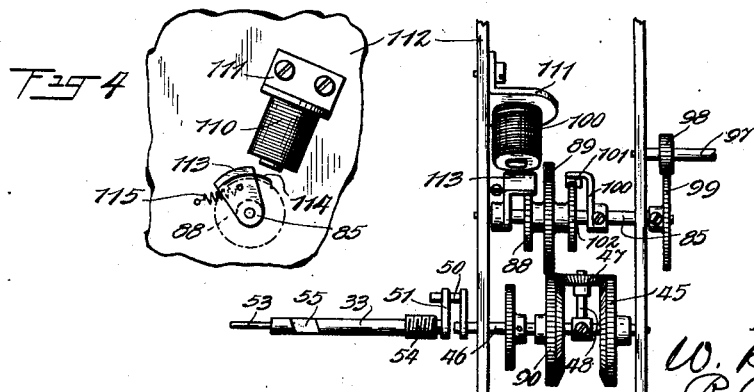
INVENTORS
W. Beusch
P. Pudelko
BY John D Morgan
ATTORNEY Patented Apr. 7, 1931

1,799,276

UNITED STATES PATENT OFFICE

WILLI BEUSCH AND RICCARD PUDELKO, OF ZUG, SWITZERLAND, ASSIGNORS TO LANDIS & GYR, A.-G., A JOINT STOCK COMPANY OF SWITZERLAND

PREPAYMENT METER

Application filed April 22, 1929, Serial No. 357,112, and in Switzerland April 25, 1928.

This invention relates to new and useful improvements in prepayment meters, and more particularly to a prepayment meter for measuring electrical energy or other fluent energy mediums and for collecting a predetermined service charge for the use of the meter.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is an elevation (partly in section) of a prepayment electric meter embodying one form of the invention;

Fig. 2 is a detail of an escapement mechanism forming a part of the mechanism shown in Fig. 1;

Fig. 3 is a detail of a modified form of the invention; and

Fig. 4 is a detail showing the intermittent driving means of Fig. 3.

The present invention provides a prepayment meter for the measurement of electrical energy or other fluent energy mediums and for the collection of a service charge independent of the operation of the meter and interrupts the flow of energy through the meter when the coins deposited by the customer have been exhausted by the consumption of energy and/or by the basic service charge. The present invention is also directed to a prepayment meter for collecting a service charge in which the load on the metering elements is very light resulting in a meter of high accuracy.

According to the present embodiment of the invention there is provided a cut-out switch in the meter circuit for interrupting the energy supplied to the customer through the meter and coin controlled means for closing the switch and for accumulating a reserve of unappropriated coins. A metering apparatus, preferably of the usual induction meter type, is connected with the usual form of totalizing register and also with the coin controlled mechanism, so that as energy is measured by the metering element, the reserve of unappropriated coins is accordingly depleted and when all the coins have been appropriated, the cut-out switch is actuated to open the meter circuit and interrupt the flow of energy to the customer until additional coins are placed in the meter. Means are also provided for indicating the total number or value of the coins deposited in the meter and other means are provided for indicating the total number or value of the unappropriated coins in the meter in return for which energy is to be supplied.

According to the present invention means are provided, preferably independent of the metering element, for periodically appropriating coins or a portion of a coin, thereby collecting a service charge for the use of the meter, reducing the reserve of unappropriated coins and hastening the opening of the switch and the interruption of the flow of energy through the meter. By these means the customer is required to pay in advance a definite service charge for each unit of time the meter is in service.

According to a slightly different and modified embodiment of the invention, the meter can be installed for central operation and the periodic collection of the service charge on all the meters so connected can be controlled from a central station by means of a contact clock or by a superposed frequency arrangement.

It will be understood that the foregoing general description and the following detailed description as well are exemplary and explanatory of the invention but are not restrictive thereof.

Referring now in detail to the present preferred embodiment of the invention as illustrated by the accompanying drawings, the invention is shown as applied to an induction meter of the Ferraris type, although it is obvious that the apparatus can be adapted for the measurement of direct current or for use with other meters.

The metering mechanism in the present embodiment comprises a rotatable disc 10 and spindle 11 journalled in suitable bearings, a current coil 12 and core 13, and a voltage coil 14 and core 15, here shown as of the usual Landis & Gyr construction. On spindle 11 is mounted a worm 16 driving worm gear 17 which is connected by reduction gearing 18 to a totalizing register 19, and integrates the energy supplied through the meter coils of the meter.

Means are provided for interrupting the flow of energy through the meter and as embodied, spaced apart spring contacts 20 are mounted on an insulating block 21 to provide a gap in series with the current coil 12 which is in series with the customer's circuit. To close this circuit, a brush 22 is mounted on rotatable arm 23 and bridges the gap when the switch is in closed position. Shaft 24, on which arm 23 is mounted, is rotatably mounted in suitable bearings and is biased by spring 26 to move to open the switch and interrupt the energy flowing through the circuit. For moving the switch to closed position and for releasably locking it in this position, shaft 24 carries a bevel gear 27 meshing with bevel gear 28 which in turn has fixed to it a mutilated gear 29 capable of being meshed with another mutilated gear 30, mounted on shaft 31. The shaft 24 and brush 22 are temporarily locked in circuit closing position by means of arm 32 mounted on shaft 24, which arm engages a stop shaft 33 and is thereby prevented from moving to circuit opening position under the influence of spring 26.

For allowing the accumulation of a reserve of unappropriated coins, the present embodiment of the prepayment meter is provided with a coin accepting mechanism generally similar to that shown in the prior application of Joseph Mettler, Ser. No. 551,398, including a knob 35 having a coin receiving slot 36 therein cooperating with a similar recess in the headed member 37 secured to shaft 38. At the bottom of the meter, there is provided a coin box 40 into which the coins are dropped after they have been placed in the coin slot and knob 35 turned to actuate the register. On shaft 38 is mounted a pinion 41 meshing with a pinion 42 mounted on a stub shaft 43, and this second pinion 42 carries fixed thereto a gear 44 meshing with a differential gear 45 loosely mounted on shaft 46. As the coins are placed in the slot and the knob turned to deposit the coins in the coin box, gears 44 and 45 are rotated and drive differential pinion 47 mounted on arm 48 fixed rigidly on shaft 46. At one end, shaft 46 is provided with a crank pin 50, coupling shaft 46 with an arm 51 rigidly mounted on stop shaft 33. Stop shaft 33 is journalled in bracket 52 so as to be longitudinally movable in its bearings, and for this purpose one end of shaft 33 is reduced to form a bearing 53 and the other end of the shaft is supported by screw threads 54. As the stop shaft 33 is turned, by rotation of knob 35, the shaft is screwed endwise in its bearings. For releasing the arm 32 and allowing spring 26 to open the switch, the stop shaft 33 is provided with a cut away portion 55 registering with the turned down portion of the arm 32 only when the coins in the meter have all been appropriated, as will be later described in more detail.

For indicating the total number or value of the coins which have been deposited in the meter there is provided a totalizing register 60, the unit wheel of which meshes with pinion 61 on shaft 62, driven from gear 44 through flexible shaft 63. Each time a coin is deposited and the knob is turned, indicator is advanced a corresponding amount to indicate the new total of coins in the box.

Means are provided for appropriating a coin or portion of a coin at the expiration of definite intervals to insure the prepayment of a service charge, or rental charge, for the installation of the meter and, as embodied, these means comprise means for periodically reducing the accumulated reserve of unappropriated coins independently of the meter operation, thereby tending to hasten the opening of the switch and the consequent interruption of the energy flowing through the meter. As embodied, there is provided a constant speed motor conventionally shown as comprising a rotatable disc 65 driven by the alternating flux produced by the current flowing through coil 66 and by core 67, the coil preferably being shunted across the voltage coil 14 of the meter. Disc 65 is mounted on shaft 68 rotatably mounted in end frames 69 and is connected with and drives gear 70 through a reduction gearing 71. Loosely mounted on shaft 72, carrying gear 70, is the gear 73, to one face of which is secured fixedly an escapement disc 74 having a notch 75 which is engaged by anchor 76 to hold disc 74 against clockwise rotation. For driving the gear 73, when the escapement is released, there is provided a spring 175 fixed to the face of gear 70 and disc 74 and always maintained in a tensioned condition by rotation of gear 70. Anchor 76 is pivotally mounted to swing and release the escapement disc allowing it to turn a half revolution on each release, and for retaining the anchor in either of its two positions there is provided a spring 77 pivotally secured to the outer end 78 of the anchor 76 and to a pin 79. Anchor 76 carries a pin 81 on each of its two inner arms 80 engageable with a pin 82 mounted on the face of gear 70, and as gear 70 rotates pin 82 trips the anchor and allows the disc 74 to rotate until stopped by the other arm of the anchor.

For transmitting the intermittent motion of this gear to the coin appropriating device the following train is provided: gear 73 meshes with pinion 83, which in turn meshes with gear 84 loosely mounted on shaft 85 and carrying pawl 86 on an arm 87 mounted at one side of gear 84. Pawl 86 engages with the teeth of ratchet 88 which is rigid with respect to gear 89, also loose on shaft 85 and in mesh with differential gear 90, loose on shaft 46. Differential gear 90 meshes with differential pinion 47 mounted on arm 48 fixed to shaft 46, and as the escapement mechanism operates to intermittently rotate gear 73, differential gear 90 and pinion 47 are rotated, rotating shaft 46 in the direction opposite to that in which it is rotated by knob 35. This action moves stop shaft 33 to the left (Fig. 1) and eventually causes the release of arm 32 with the consequent interruption of the energy.

For appropriating the coins as energy is measured by the meter, meter spindle 11 is provided with a worm 95 meshing with worm gear 96 on shaft 97, mounted in suitable bearings, and carrying pinion 98, meshing with gear 99 fixedly mounted on shaft 85. Also mounted on shaft 85 is a pawl supporting arm 100 carrying pawl 101 engaging with the teeth of ratchet 102 rigidly mounted on one side of gear 89. As energy is measured by the rotation of meter disc 10, the rotation is transmitted through gearing to the pawl 101 which drives gear 89 and results in stop shaft 33 being moved to the left in the same manner as when appropriating coins for the service charge. The operation of the meter and the coin appropriating mechanism for the service charge do not interfere with each other, and when the meter is registering the consumption of energy while the escapement is released, the quick action of the escapement causes gear 89 to be driven by pawl 86 momentarily ahead of pawl 101, and its driving by pawl 101 is thereafter resumed.

For indicating the reserve of unappropriated coins there is provided a totalizing register 103 connected by gears 104 with gear 105 fixed on shaft 46 and driven by differential pinion 47, and as the reserve is decreased, either by consumption of energy or by operation of the service charge device, the register is thereby reversely driven to decrease the total shown by it.

At any time when coins are deposited in the coin box by turning knob 35, register 60 shows the new total of coins deposited, register 103 shows the unappropriated coins, and when all accumulated service charges are paid the new coin will close the cut-out switch, should it be open.

The operation of the above-described mechanism may be briefly summarized as follows:

The turning of knob 35, while a coin is deposited in slot 36 closes the cut-out switch, advances registers 60 and 103 and moves stop shaft 33 to a position to obstruct the return movement of arm 32.

At periodically recurring intervals of time, pawl 86 is stepped ahead to advance ratchet 88, and this moves stop shaft 33 to the left and reduces the total of unappropriated coins shown by register 103, and this operation is independent of the measurement of energy by the meter.

Meter disc 10 rotates in accordance with the consumption of energy by the customer, and drives register 19 to increase the indicated total and also drives register 103 to decrease the indicated total of unappropriated coins, at the same time moving stop shaft to the left, as is done by pawl 86.

Figs. 3 and 4 show an embodiment of the invention for centralized control, and in this embodiment the construction is generally similar to the previously described mechanism except that a periodically energized electromagnet is employed in place of the constant speed motor and escapement mechanism.

In this modification stop shaft 33 is rotated and moved endwise by movement of pinion 47, as described above and differential gear 45 is moved by turning knob 35 with a coin in slot 36. Differential gear 90 is driven, to reduce the total shown by register 103 and to move stop shaft 33 to circuit opening position, by meter disc 10 through gears 98, 99, pawl 101, and gear 89.

For actuating the coin appropriating mechanism there is provided an electromagnet 110 mounted on bracket 111 supported by frame 112 and as this magnet is energized by impulses received by it from a central contact clock it attracts armature 113 loosely and rotatably mounted on shaft 85. Armature 113 carries pawl 114 for engaging the teeth of ratchet 88 as it is moved by magnet 110. A spring 115 serves to return armature 113 and pawl 114 to their normal position and ready to move when the next periodic impulse is received from the contact clock.

The invention in its broader aspects is not limited to the specific mechanisms shown and described but departures may be made therefrom within the scope of the accompanying claims without departing from the principles of the invention and without sacrificing its chief advantages.

What we claim is:—

1. A prepayment meter including in combination an energy meter, a cut-out switch, coin appropriating means actuated by the meter for operating the cut-out switch and means for actuating the coin appropriating means independently of the meter.

2. A prepayment meter including in combination an energy meter, a cut-out switch, coin appropriating means actuated by the meter for operating the cut-out switch when an amount of energy equivalent to the coins has been measured by the meter, and means for periodically actuating the coin appropriating means independently of the meter.

3. A prepayment meter including in combination an energy meter, a cut-out switch, coin actuated means for closing the switch, coin appropriating means actuated by the meter for opening the cut-out switch and means for actuating the coin appropriating means at definite intervals independently of the meter.

4. A prepayment meter including in combination an energy meter, a cut-out switch, coin appropriating means actuated by the meter for opening the cut-out switch and a constant speed motor for actuating the coin appropriating means at definite intervals independently of the meter.

5. A prepayment meter including in combination an energy meter, a cut-out switch, coin appropriating means actuated by the meter for operating the cut-out switch, means for actuating the coin appropriating means independently of the meter, and means for indicating the value of the remaining coins to be appropriated by the meter.

6. A prepayment meter including in combination an energy meter, a cut-out switch, coin appropriating means actuated by the meter for operating the cut-out switch when an amount of energy equivalent to the coins has been measured by the meter, means for periodically actuating the coin appropriating means independently of the meter, and means for indicating the value of the remaining coins to be appropriated by the meter.

7. A prepayment meter including in combination an energy meter, a cut-out switch, coin appropriating means actuated by the meter for opening the cut-out switch and a constant speed motor for actuating the coin appropriating means at definite intervals independently of the meter, and means for registering the total energy measured by the meter.

8. A prepayment meter including in combination an energy meter, a cut-out switch, coin appropriating means actuated by the meter for opening the cut-out switch and a constant speed motor for actuating the coin appropriating means at definite intervals independently of the meter, means for registering the total energy measured by the meter, and means for indicating the value of the remaining coins to be appropriated by the meter.

9. A prepayment meter including in combination an energy meter, a cut-out switch, coin appropriating means actuated by the meter for opening the cut-out switch, coin actuated means for closing the switch, and means for indicating the value of the remaining coins to be appropriated by the meter.

10. A prepayment meter including in combination an electric meter, a totalizing register driven thereby, a cut-out switch, coin controlled means for closing the switch and for preventing the opening of the switch so long as the value of the deposited coins exceeds the value of the metered energy, periodically actuated means for intermittently appropriating a portion of the coins equivalent to a predetermined service charge, means for opening the switch when the value of the metered energy and the service charges exceed the value of the deposited coins, means for indicating the value of the unappropriated coins.

11. A prepayment meter including in combination an electric meter, a cut-out switch, coin controlled means for closing the switch and for preventing the opening of the switch so long as the value of the deposited coins exceeds the value of the metered energy, periodically actuated means for intermittently appropriating a portion of the coins, equivalent to a predetermined service charge, and means for opening the switch when the value of the metered energy and the service charges exceed the value of the deposited coins.

12. A prepayment meter including in combination an electric meter, a totalizing register driven thereby, a cut-out switch, coin controlled means for closing the switch and for preventing the opening of the switch so long as the value of the deposited coins exceeds the value of the metered energy, periodically actuated means for intermittently appropriating a portion of the coins equivalent to a predetermined service charge, and means for opening the switch when the value of the metered energy and the service charges exceed the value of the deposited coins.

13. A prepayment meter including in combination an electric meter, a cut-out switch, coin controlled means for closing the switch and for preventing the opening of the switch so long as the value of the deposited coins exceeds the value of the metered energy, periodically actuated means for intermittently appropriating a portion of the coins equivalent to a predetermined service charge, means for opening the switch when the value of the metered energy and the service charges exceed the value of the deposited coins, and means for indicating the value of the unappropriated coins.

14. A prepayment meter including in combination an integrating meter, means for interrupting the supply of the medium being metered, coin-appropriating means actuated by the meter for operating the interrupting means and means for actuating the coin appropriating means independently of the meter.

15. A prepayment meter including in combination an integrating meter, means for interrupting the supply of the metered medium, coin actuating means for closing the interrupting means, coins appropriating means actuated by the meter for opening the interrupting means and means for actuating the coin appropriating means at definite intervals independently of the meter.

16. A prepayment meter including in combination an integrating meter, means for interrupting the supply of the metered medium, coin appropriating means actuated by the meter for opening the interrupting means and a constant speed motor for actuating the coin appropriating means at definite intervals independently of the meter.

In testimony whereof, we have signed our names to this specification.

WILLI BEUSCH.
RICCARD PUDELKO.